(12) United States Patent
Kim et al.

(10) Patent No.: US 10,268,035 B2
(45) Date of Patent: Apr. 23, 2019

(54) ELECTROWETTING DISPLAY DEVICE

(75) Inventors: Gwan Ha Kim, Hwaseong-si (KR);
Seonggyu Kwon, Suwon-si (KR);
Sangil Kim, Yongin-si (KR);
Sunghwan Kim, Yongin-si (KR);
Junheui Lee, Suwon-si (KR); Hyun Sup Lee, Suwon-si (KR); Jinwoo Choi, Seoul (KR)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/604,131

(22) Filed: Sep. 5, 2012

(65) Prior Publication Data
US 2013/0301105 A1 Nov. 14, 2013

(30) Foreign Application Priority Data
May 10, 2012 (KR) ........................ 10-2012-0049785

(51) Int. Cl.
*G02B 26/00* (2006.01)
*G02F 1/03* (2006.01)
(Continued)

(52) U.S. Cl.
CPC ........... *G02B 26/005* (2013.01); *G09G 3/348* (2013.01); *G09G 2300/04* (2013.01)

(58) Field of Classification Search
CPC .... G02B 26/005; G02B 26/004; G02B 26/02; G02B 26/007; G02B 26/008; G02B 3/14; G02B 2207/115; G02B 5/23; G02B 26/00; G02B 26/08; G02B 1/06; G02F 1/0018; G02F 1/133345; G02F 1/167;
(Continued)

(56) References Cited

U.S. PATENT DOCUMENTS 7,205,355 B2 * 4/2007 Liang et al. ............... 524/474
7,215,404 B2   5/2007 Chun et al.
(Continued)

FOREIGN PATENT DOCUMENTS

JP   2002040445 A   2/2002
JP   2003107533 A   4/2003
(Continued)

OTHER PUBLICATIONS

Korean Office Action dated Apr. 16, 2018 for Korean Patent Application No. 10-2012-0049785.

*Primary Examiner* — Dawayne Pinkney
(74) *Attorney, Agent, or Firm* — EIP US LLP

(57) ABSTRACT

An electrowetting display device includes a first base substrate, a partition wall which is on the first base substrate and partitions pixels, a second base substrate which faces the first base substrate, column spacers which are on the second base substrate and contact the partition wall, an electrowetting layer which is between the first and second base substrates and includes a first fluid and a second fluid immiscible with each other, and channels disposed in a boundary area between the pixels. The second fluid has electrical conductivity or electrical polarity. The boundary area is overlapped with the partition wall and the channels define a flow path of the second fluid. The column spacers are in the boundary area between the pixels except for a boundary area including the channels.

22 Claims, 16 Drawing Sheets

(51) Int. Cl.
  *G02F 1/29* (2006.01)
  *G02F 1/133* (2006.01)
  *G09G 3/34* (2006.01)

(58) Field of Classification Search
  CPC ... G02F 1/133; G02F 1/29; G02F 1/01; G02F 1/03; G02F 1/15; G02F 1/155; G02F 1/153
  USPC ....... 359/290–296, 223, 224, 225, 243, 260, 359/261, 262, 263, 298, 198, 301, 302, 359/303, 315, 316, 317, 318, 237, 242, 359/253, 276, 238, 245, 259, 244; 349/33; 252/586; 427/58, 596
  See application file for complete search history.

(56) References Cited

U.S. PATENT DOCUMENTS

| | | | |
|---|---|---|---|
| 7,256,859 B2 | 8/2007 | Kim et al. | |
| 7,492,435 B2* | 2/2009 | Jeon | 349/155 |
| 7,529,012 B2* | 5/2009 | Hayes | G02B 26/005 359/228 |
| 7,567,333 B2 | 7/2009 | Lee et al. | |
| 7,813,030 B2* | 10/2010 | Lo | G02B 26/005 345/60 |
| 2007/0019006 A1* | 1/2007 | Marcu | G02B 26/005 345/690 |
| 2008/0130087 A1* | 6/2008 | Miyata et al. | 359/267 |
| 2009/0059348 A1* | 3/2009 | Niwano et al. | 359/296 |
| 2009/0136362 A1* | 5/2009 | Yanagisawa et al. | 417/48 |
| 2009/0169806 A1 | 7/2009 | Lo et al. | |
| 2010/0225611 A1* | 9/2010 | Lee et al. | 345/174 |
| 2010/0302497 A1 | 12/2010 | Chang | |
| 2010/0321760 A1* | 12/2010 | Hayes et al. | 359/290 |
| 2011/0013255 A1* | 1/2011 | Hsieh | G02B 3/14 359/290 |
| 2011/0181952 A1 | 7/2011 | Kim et al. | |
| 2011/0194168 A1 | 8/2011 | Slack et al. | |
| 2012/0081777 A1* | 4/2012 | Heikenfeld et al. | 359/290 |
| 2012/0154886 A1* | 6/2012 | Heikenfeld et al. | 359/228 |
| 2013/0235445 A1* | 9/2013 | Teranishi | G09F 9/372 359/290 |

FOREIGN PATENT DOCUMENTS

| | | |
|---|---|---|
| JP | 2004171968 A | 6/2004 |
| JP | 2010085796 A | 4/2010 |
| KR | 1020050061859 A | 6/2005 |
| KR | 1020060012136 A | 2/2006 |
| KR | 1020060060972 A | 6/2006 |
| KR | 1020070023999 A | 3/2007 |
| KR | 1020070074891 A | 7/2007 |

\* cited by examiner

ELECTROWETTING DISPLAY DEVICE

This application claims priority to Korean Patent Application No. 10-2012-0049785, filed on May 10, 2012, and all the benefits accruing therefrom under 35 U.S.C. § 119, the content of which in its entirety is herein incorporated by reference.

BACKGROUND

1. Field

The disclosure relates to an electrowetting display device. More particularly, the disclosure relates to an electrowetting display device capable of effectively preventing damage by an external impact thereto and controlling a break point of a fluid stream.

2. Description of the Related Art

In recent, various display devices, such as a liquid crystal display, an organic light emitting diode display, an electrowetting display device, a plasma display panel or an electrophoretic display device have been developed.

Among them, the electrowetting display device has been spotlighted as a next generation display device since the electrowetting display device has advantageous properties, e.g., lower power consumption, faster response speed, higher visibility, compared to the liquid crystal display.

In general, the electrowetting display device includes a display panel including a plurality of pixels. The display panel includes a first base substrate including a pixel electrode thereon, a second base substrate including a common electrode thereon, the second base substrate facing the first base substrate, and an electrowetting layer disposed between the first and second base substrates.

According to voltages respectively applied to the pixel electrode and the common electrode, a movement of the electrowetting layer is controlled. Each pixel displays a gray scale in association with the movement of the electrowetting layer. A partition wall is on the first substrate to partition the plurality of the pixels and a column spacer is on the second base substrate to maintain a cell gap of the display panel.

SUMMARY

The disclosure provides an electrowetting display device capable of maintaining a cell gap, providing a flow path of a fluid, and effectively preventing damage by an external impact thereto.

The disclosure provides an electrowetting display device capable of controlling a break point of a fluid stream.

Embodiments of the invention provide an electrowetting display device including a first base substrate, a partition wall which is on the first base substrate and partitions a plurality of pixels, a second base substrate which faces the first base substrate, a plurality of column spacers which is on the second base substrate and contacts the partition wall, an electrowetting layer which is between the first and second base substrates and includes a first fluid and a second fluid immiscible with each other, and a plurality of channels which is in a boundary area between the pixels, is the boundary area overlapped with the partition wall, wherein the plurality of channels defines a flow path of the second fluid. The second fluid has electrical conductivity or electrical polarity, and the plurality of column spacers is in the boundary area between the plurality of pixels except for a boundary area including the plurality of channels.

Each of the plurality of column spacers includes a first branch portion which extends in a first direction and second and third branch portions which alternately extend from the first branch portion in directions substantially crossing the first direction, the second branch portion extends in a right direction, and the third branch portion extends in a left direction.

The plurality of channels include a plurality of first channels and a plurality of second channels, each of the first channels is between the second branch portion and the first branch portion adjacent to the second branch portion, and each of the second channels is between the third branch portion and the first branch portion adjacent to the third branch portion.

Each of the first channels has a width smaller than a distance between two first branch portions adjacent to each other, each of the second channels has a width smaller than the distance between two first branch portions adjacent to each other, and the width of each of the first channels is substantially equal to the width of each of the second channels.

The plurality of column spacers include a first spacer layer which includes a porous material having hydrophilicity and elasticity and a second spacer layer which includes a solid organic material, and the first spacer layer is disposed on the second spacer layer.

The electrowetting display device further includes a common electrode which is on the second base substrate, and the plurality of column spacers is on the common electrode.

The electrowetting display device further includes a plurality of pixel electrodes which is on the first base substrate and respectively corresponds to the plurality of pixels and an insulating layer which is on the first base substrate. The insulating layer covers the plurality of pixel electrodes. The partition wall is on the insulating layer and the first fluid is on the insulating layer.

The plurality of pixels are arranged in rows and columns, each of the plurality of pixels has substantially a rectangular shape, and the boundary area includes first, second, third, and fourth boundary areas respectively corresponding to first, second, third, and fourth sides of each of the plurality of pixels.

The plurality of column spacers include a first column spacer in the first and second boundary areas corresponding to first pixels arranged in odd-numbered rows and even-numbered columns and having a right angle bent shape, a second column spacer in the third and fourth boundary areas corresponding to the first pixels and having a right angle bent shape, a third column spacer in the second and third boundary areas corresponding to the second pixels arranged in even-numbered rows and odd-numbered columns and having a right angle bent shape, and a fourth column spacer in the first and fourth boundary areas corresponding to the second pixels and having a right angle bent shape.

The plurality of channels includes a plurality of first channels and a plurality of second channels. The first channels are between the first column spacer and the third column spacer which are adjacent to each other, and between the first column spacer and the fourth column spacer which are adjacent to each other, and the second channels are between the second column spacer and the third column spacer which are adjacent to each other, and between the second column spacer and the fourth column spacer which are adjacent to each other. Each of the first and second channels has a width smaller than a distance between a surface of the first column spacer and a surface of the second column spacer adjacent to the first column spacer, the surface of the first column spacer and the surface of the second column spacer facing each other, and the width of each of the first channels is substantially equal to the width of each of the second channels.

Embodiments of the invention provide an electrowetting display device includes a first base substrate, a partition wall which is on the first base substrate and partitions a plurality of pixels, a second base substrate which faces the first base substrate, a plurality of first column spacers which extends in a row direction on the second base substrate and crosses a center portion of a row of pixels, a plurality of second column spacers which extends in the row direction, an electrowetting layer which is between the first and second base substrates and includes a first fluid and a second fluid immiscible with each other, and a common electrode which is on the second base substrate, and covers the first column spacers and the second column spacers. The second fluid has electrical conductivity or electrical polarity and the partition wall includes first grooves respectively located at areas in which the first column spacers cross the partition wall. The common electrode is on a lower surface of each of the first column spacers contacts the partition wall in the first grooves respectively.

The first fluid is in the plurality of pixels and includes a first boundary surface corresponding to an upper surface of the partition wall, and the plurality of first column spacers, and the common electrode which is on the lower surface of the first column spacers, protrude into the first fluid, in an area corresponding to the center portion of the row of pixels, by a step difference between the upper surface of the partition wall and a bottom surface of the first grooves.

The plurality of second column spacers is in boundary areas between the pixels, the boundary areas extending in a row direction.

The partition wall further includes second grooves respectively located at areas in which the second column spacers cross the partition wall, and the common electrode is on a lower surface of each of the second column spacers contacts the partition wall in the second grooves respectively.

Embodiments of the invention provide an electrowetting display device including a first base substrate, a partition wall which is on the first base substrate and partitions a plurality of pixels, a second base substrate which faces the first base substrate, a column spacer which is on the second base substrate and overlaps with the partition wall, a common electrode which is on the second base substrate and covers the column spacer, and an electrowetting layer which is between the first and second base substrates and includes a first fluid and a second fluid, which are immiscible with each other. The second fluid has electrical conductivity or electrical polarity, the column spacer includes a porous material having hydrophilicity and elasticity, and the common electrode which is on a lower surface of the column spacer contacts the partition wall.

Embodiments of the invention provide an electrowetting display device including a first base substrate, a partition wall which is on the first base substrate and partitions a plurality of pixels, a second base substrate which faces the first base substrate, a plurality of column spacers which is on the second base substrate and has a cylinder shape, a common electrode which is on the second base substrate and covers the column spacers, and an electrowetting layer which is between the first and second base substrates and includes a first fluid and a second fluid which are immiscible with each other. The first fluid is in the plurality of pixels and including a first boundary surface corresponding to an upper surface of the partition wall and the second fluid having electrical conductivity or electrical polarity. The plurality of column spacers includes a plurality of first column spacers located at a center portion of pixel rows, and a plurality of second column spacers which is in a boundary area between the pixels and are overlapped with the partition wall. The partition wall includes a plurality of grooves, and the common electrode which is on a lower surface of the second column spacers contacts the partition wall in the plurality of grooves. The first column spacers and the common electrode which is on a lower surface of the first column spacers, protrude into the first fluid by a step difference between the upper surface of the partition wall and a bottom surface of the grooves.

According to the above, the electrowetting display device may maintain the cell gap using the column spacers, provide the flow path of the fluids when the pixels are driven, and effectively prevents from being damaged. In addition, the electrowetting display device may control the break point of the fluid stream.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1:
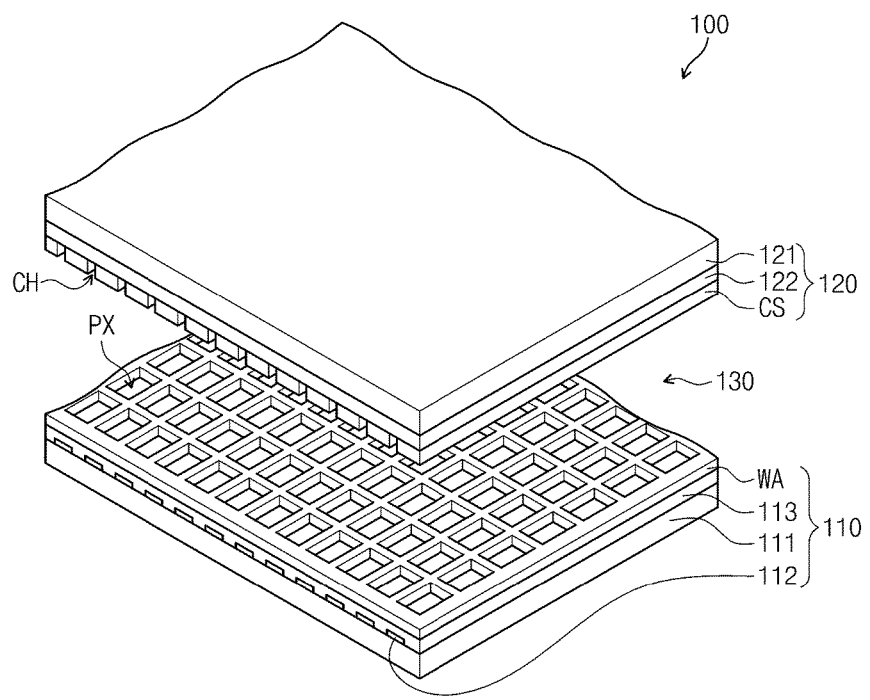
FIG. 1 is a perspective view showing an exemplary embodiment of an electrowetting display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a perspective view showing an exemplary embodiment of an electrowetting display device according to the invention.

Referring to FIG. 1, an electrowetting display device 100 includes a first substrate 110, a second substrate 120 facing the first substrate 110, and an electrowetting layer 130 disposed between the first and second substrates 110 and 120.

The first substrate 110 includes a first base substrate 111, a plurality of pixel electrodes 112 arranged on the first base substrate 111, an insulating layer 113 disposed on the first base substrate 111 and the pixel electrodes 112 to cover the pixel electrodes 112, and a partition wall WA disposed on the insulating layer 113 to partition a plurality of pixels PX.

The pixel electrodes 112 correspond to the pixels PX, respectively, and include a transparent conductive material such as, for example, indium tin oxide ("ITO"), conductive polymer, or carbon nanotube ("CNT").

The insulating layer 113 may be surface-treated to have hydrophobicity or may have the hydrophobicity by a hydrophobic layer (not shown) thereon. The partition wall WA may be formed by using a photoresist or by patterning an insulating layer including, for example, SiNx, SiOx.

The pixels PX are arranged in n rows and m columns. Each of "n" and "m" is an integer number greater than zero (0). The pixels PX include a red pixel, a green pixel, and a blue pixel, but are not limited thereto or thereby. The red, green, and blue pixels are arranged in a row direction and a column direction in a regularly repeated pattern. However, arrangement of the pixels PX is not limited thereto or thereby.

The second substrate 120 includes a second base substrate 121 facing the first base substrate 111, a common electrode 122 disposed on the second base substrate 122, a plurality of column spacers CS disposed on the common electrode 122, and a plurality of channels CH.

The channels CH are disposed in a boundary area between the pixels PX which is an area in which the partition wall WA is disposed. The column spacers CS are disposed in the boundary area between the pixels PX except for the boundary area in which the channels CH are disposed. The configuration of the channels CH and the column spacers CS will be described in more detail with reference to FIG. 2.

Although not shown in FIG. 1, the second substrate 120 may further include color filters disposed between the second base substrate 121 and the common electrode 122. Each color filter may correspond to a color pixel that represents a red, green, or blue color.

The common electrode 122 is applied with a common voltage and includes a transparent conductive material such as, for example, ITO or indium zinc oxide ("IZO").

The first and second base substrates 111 and 121 may be a transparent insulator and may include a polymer, e.g., glass or plastic.

In a case where the first and second base substrates 111 and 121 include the plastic substrate, each of the first and second base substrates 111 and 121 may include polyethylene terephthalate ("PET"), fiber reinforced plastic ("FRP"), or polyethylene naphthalate ("PEN"). In addition, when each of the first and second base substrates 111 and 121 includes the plastic substrate, the first and second base substrates 111 and 121 may be flexible.

The electrowetting layer 130 includes a first fluid and a second fluid, which are immiscible with each other. The first fluid has electrical non-conductivity or electrical non-polarity and the second fluid has electrical conductivity or electrical polarity.

The channels CH serve as a flow path of the electrowetting layer 130 between the pixels PX.

The electrowetting layer 130 is moved by using a gray-scale voltage applied to the pixel electrode 112 and the common voltage applied to the common electrode 122, and thus a desired image is displayed through the electrowetting display device 100. An operation of the pixels will be described in more detail with reference to FIGS. 3A and 3B.

Figure 2:
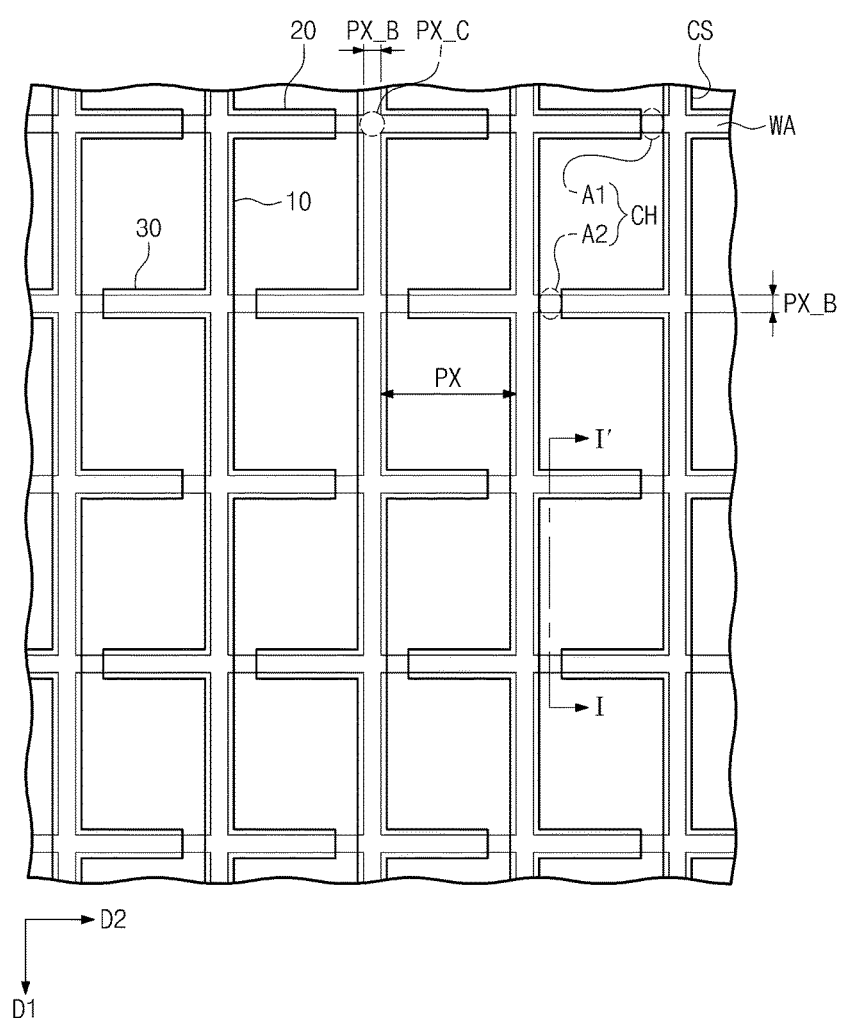
FIG. 2 is a plan view showing an exemplary embodiment of a configuration of a pixel, a partition wall, a column spacer, and a channel of FIG. 1.

FIG. 2 is a plan view showing an exemplary embodiment of a configuration of a pixel, a partition wall, a column spacer, and a channel of FIG. 1. In FIG. 2, for the convenience of explanation, the column spacers are shown in a bold line compared with the partition wall.

Referring to FIG. 2, the pixels PX are arranged in substantially a matrix form and a boundary area PX_B between the pixels PX is overlapped with the partition wall WA.

The channels CH include a plurality of first channels A1 and a plurality of second channels A2. The column spacers CS are disposed in the boundary area PX_B, except for the boundary area PX_B including the first channels A1 and the second channels A2, and make contact with the partition wall WA. A contact configuration between the column spacer CS and the partition wall WA will be described in detail with reference to FIGS. 3A and 3B.

Each column spacer CS includes a first branch portion 10 extending in a first direction D1 and second and third branch portions 20 and 30 extending from the first branch portion 10 in a direction substantially crossing the first direction D1. In detail, the second branch portion 20 extends in a second direction D2 from the first branch portion 10 and the third branch portion 30 extends in a third direction, i.e., an opposite direction to the second direction D2, from the first branch portion 10. In an exemplary embodiment of FIG. 2, the second direction D2 is a right direction and the third direction is a left direction.

Each first channel A1 is between the second branch portion 20 of one column spacer CS and the first branch portion 10 of another column spacer CS adjacent to the second branch portion 20 of the one column spacer CS. Accordingly, each first channel A1 has a width corresponding to a distance between the second branch portion 20 of the one column spacer CS and the first branch portion 10 of another column spacer CS adjacent to the second branch portion 20 of the one column spacer CS.

Each second channel A2 is between the third branch portion 30 of one column spacer CS and the first branch portion 10 of another column spacer CS adjacent to the third branch portion 30 of the one column spacer CS. Accordingly, each second channel A2 has a width corresponding to a distance between the third branch portion 30 of the one column spacer CS and the first branch portion 10 of another column spacer CS adjacent to the third branch portion 30 of the one column spacer CS.

The first and second channels A1 and A2 may have substantially the same width, but are not limited thereto or thereby. Also, the first and second channels A1 and A2 may have a width smaller than a distance between two first branch portions 10 adjacent to each other.

The column spacers CS are used to maintain a cell gap, i.e., a distance between the first base substrate 111 and the second base substrate 121.

If an area of the column spacers CS disposed in the boundary area PX_B becomes large, the cell gap may be stably maintained. Therefore, the cell gap may be more stably and effectively maintained by the column spacers CS disposed in the boundary area PX_B than by the column spacers disposed in an intersection area PX_C of the boundary area PX_B.

The column spacer CS may be in the boundary area PX_B to have a lattice shape similar to the partition wall WA so as not to include the channels CH. However, when the column spacer CS has the lattice shape and makes contact with the partition wall WA, the second fluid is accommodated in a closed area. In this case, the movement of the second fluid is limited to the closed area. As a result, a level of a driving voltage (or the gray-scale voltage) of the pixel PX, which is applied to the pixel PX to move the second fluid, may need to be increased.

However, in an exemplary embodiment of the invention, the electrowetting display device 100 includes the channels CH, and thus the second fluid may move between the pixels PX. Thus, a higher level of the driving voltage is not required.

Figure 3A:
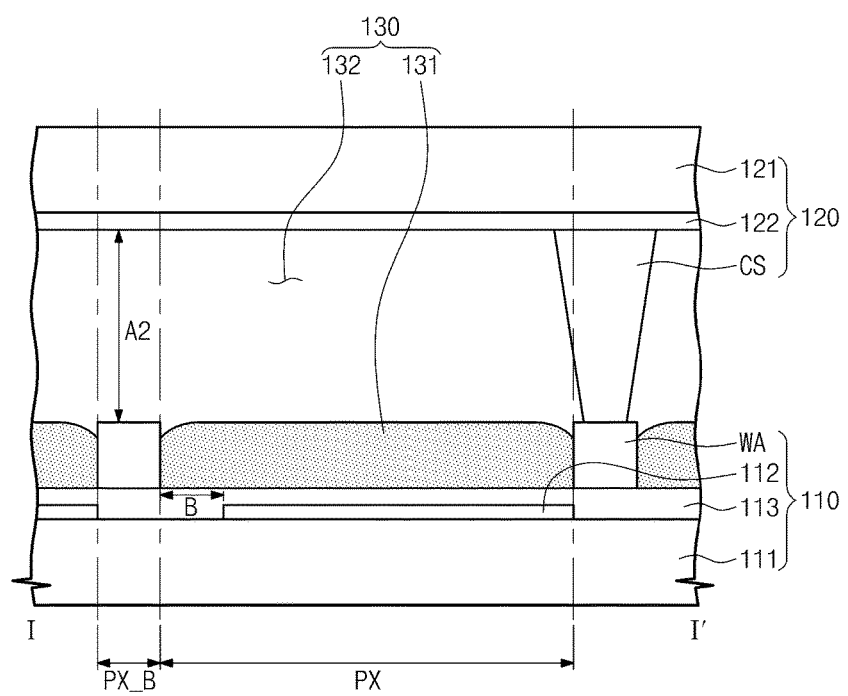
FIGS. 3A and 3B are cross-sectional views taken along line I-I' of FIG. 2.
Figure 3B:
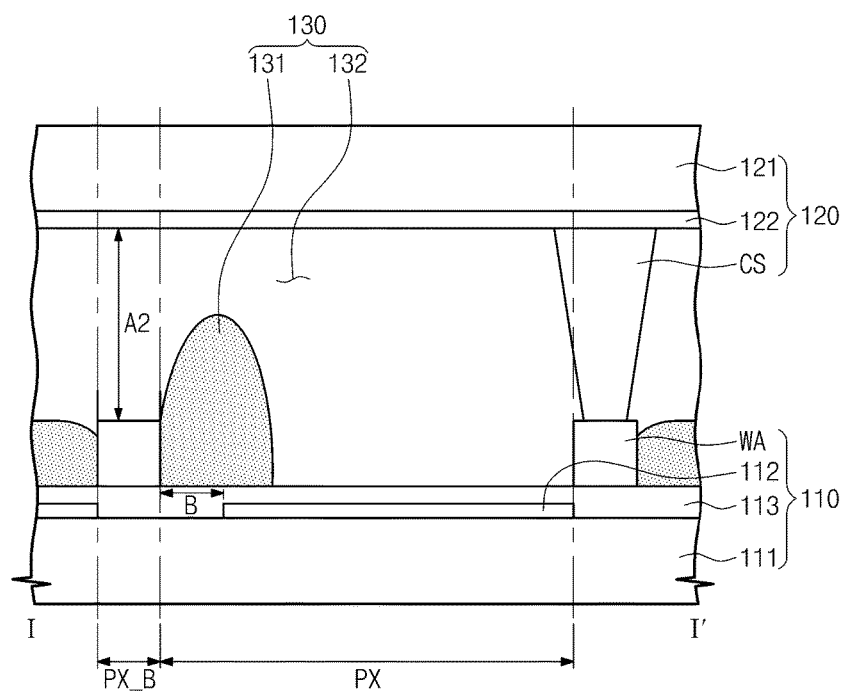

FIGS. 3A and 3B are cross-sectional views taken along line I-I' of FIG. 2.

FIG. 3A shows the electrowetting layer when no voltage is applied to the pixel and FIG. 3B shows the electrowetting layer when the gray-scale voltage is applied to the pixel.

Referring to FIG. 3A, the electrowetting layer 130 includes the first fluid 131 and the second fluid 132, which are immiscible with each other.

The first fluid 131 has the electrical non-conductivity or the electrical non-polarity and the second fluid 132 has the electrical conductivity or the electrical polarity. In addition, the first fluid 131 has hydrophobicity and the second fluid 132 has hydrophilicity.

In an exemplary embodiment, the first fluid 131 may include an organic solvent such as, for example, silicon oil, mineral oil, or carbon tetrachloride ($CCL_4$). The second fluid 132 may include an aqueous solution and electrolyte such as, for example, sodium chloride (NaCl).

The first fluid 131 includes a black dye or a material capable of absorbing light to absorb light incident thereto. In addition, the first fluid 131 is dispersed over the pixel PX or moves to a side portion of the pixel PX in accordance with voltages respectively applied to the pixel electrode 112 and the common electrode 122, thereby operating as a light shutter. The second fluid 132 may be transparent, and thus, the second fluid 132 may transmit light incident thereto.

The first fluid 131 and the second fluid 132 have different polarities from each other, and thus the first fluid 131 and the second fluid 132 are immiscible with each other and make contact with each other. The first fluid 131 is disposed on the insulating layer 113 of each pixel PX partitioned by the partition wall WA and the second fluid 132 is disposed on the first fluid 131.

In an exemplary embodiment, the first fluid 131 includes a dye or a material which may represent one of red, green, and blue colors. In this case, the color filter may not be included in the electrowetting display device 100.

FIG. 3A shows a configuration of the pixel of the electrowetting display device which is a transmission type display device. However, it should be noted that the electrowetting display device according to the invention may be a reflection type display device.

Although not shown in FIG. 3A, in a case where the electrowetting display device 100 is the reflection type display device, the electrowetting display device 100 may further include a reflective layer including a reflective metal, e.g., aluminum and/or aluminum-neodymium. The reflective layer may be disposed on the pixel electrode 112 or under the first substrate 110. However, alternatively, the pixel electrode 112 may be configured to include the reflective metal, e.g., aluminum, so as to reflect the light instead of employing the reflective layer.

The pixel PX includes a first area B corresponding to an area between the partition wall WA and the pixel electrode 112. The pixel electrode 112 is not in the first area B.

When the gray-scale voltage is not applied to the pixel electrode 112, the pixel PX displays a black gray-scale since the first fluid 131 covers the insulating layer 113 as shown in FIG. 3A.

Referring to FIG. 3B, when the gray-scale voltage is applied to the pixel electrode 112, the second fluid 132 pushes out the first fluid 131 to the side portion of the pixel PX and makes contact with the insulating layer 113. In detail, the common voltage is applied to the common electrode 122 and the gray-scale voltage having a different level from that of the common voltage is applied to the pixel electrode 112. In this case, the second fluid 132 is polarized to make contact with the insulating layer 113, and thus the first fluid 131 is pushed out to the side portion of the pixel PX by the second fluid 132.

The first fluid 131 that includes the organic solvent tends to gather together. Accordingly, the first fluid 131 is pushed out to the side portion of the pixel PX by the second fluid 132 and stably drawn together in the side portion of the pixel PX.

In an exemplary embodiment, since the pixel electrode 112 is not in the first area B of the pixel PX shown in FIG. 3B, an electric field is not generated in the first area B. As a result, the first fluid 131 may be gathered in the side portion of the pixel PX, which includes the first area B. That is, as shown in FIG. 3B, the first fluid 131 may be gathered to the left-side portion of the pixel PX. In this case, the light transmits through the second fluid 132 so that the pixel PX displays a predetermined image.

A degree at which the first fluid 131 is pushed out depends on a voltage level difference between the gray-scale voltage applied to the pixel electrode 112 and the common voltage applied to the common electrode 122. In an exemplary embodiment, as the voltage level difference between the common voltage and the gray-scale voltage increases, an amount of the first fluid 131 pushed out toward the first area B increases. The common voltage has a constant level and the gray-scale voltage has a level corresponding to a gray-scale displayed in the pixel PX. Thus, the amount of the first fluid 131 pushed out toward the first area B may be decided by the level of the gray-scale voltage applied to the pixel electrode 112.

The first fluid 131 pushed out to the side portion of the pixel PX has a height higher than a height of the partition wall WA as shown in FIG. 3B. A side surface of the partition wall WA has the hydrophobicity and an upper surface of the partition wall WA has the hydrophilicity. Thus, although the first fluid 131 has the height higher than that of the partition wall WA, the first fluid 131 has a chemical affinity to the side surface of the partition wall WA, which is higher than a chemical affinity to the upper surface of the partition wall WA. As a result, the first fluid 131 may be effectively prevented from moving to an adjacent pixel beyond the partition wall WA.

When the column spacer CS is disposed instead of the second channel A2 in an area in which the second channel A2 is disposed, the electrowetting layer 130 is disposed in a closed area of the pixel PX. As described above, the first fluid 131 does not move to the adjacent pixel, however, the second fluid 132 pushes out the first fluid 131 and makes contact with the insulating layer 113. Accordingly, if the second channel A2 is provided, the second fluid 132 may move between the pixels PX adjacent to each other. The second fluid 132 may move more fluidly in an opened area than in the closed area.

When the second channel A2 is not provided and the second fluid 132 is disposed in the closed area of the pixel PX, the movement of the second fluid 132 is limited to the closed area of the pixel PX. However, the second fluid 132 of the electrowetting display device 100 according to an exemplary embodiment may move between the pixels PX adjacent to each other through the second channel A2. In this case, the second fluid 132 may come into contact with the insulating layer 113 quicker than when the second fluid 132 is disposed in the closed area of the pixel PX, so the second fluid 132 may push out the first fluid 131 to the side portion of the pixel PX more quickly.

Consequently, by using the column spacers CS, the electrowetting display device 100 may maintain the cell gap thereof and provide a flow path of the second fluid 132 of the electrowetting layer 130 when the pixel PX is driven.

Figure 4:
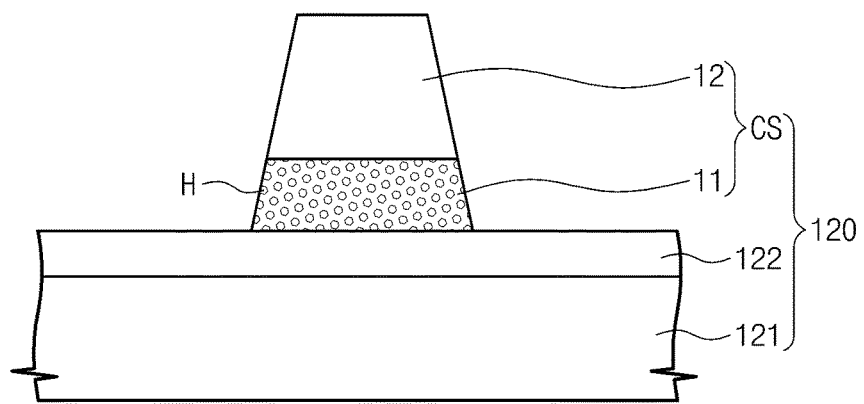
FIGS. 4 to 6 are cross-sectional views showing exemplary embodiments of a configuration of a column spacer of FIG. 2.
Figure 5:
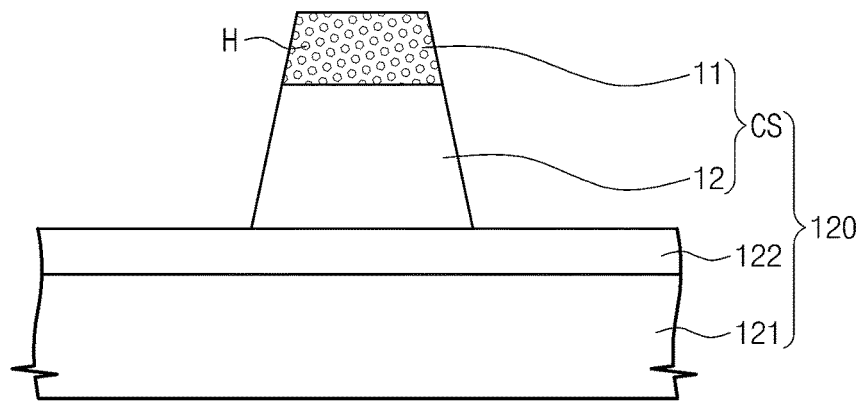
Figure 6:
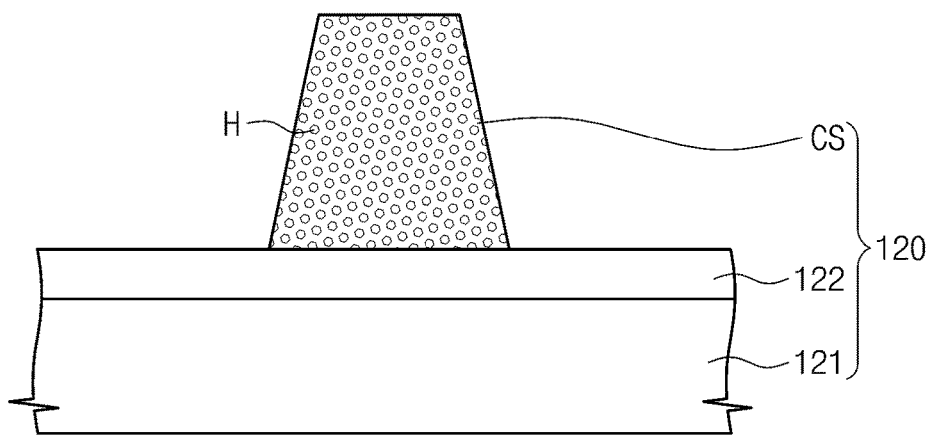

FIGS. 4 to 6 are cross-sectional views showing exemplary embodiments of a configuration of the column spacer of FIG. 2.

Referring to FIG. 4, the column spacer CS includes a first spacer layer 11 disposed on the common electrode 122 and a second spacer layer 12 disposed on the first spacer layer 11. The common electrode 122 is disposed on the second base substrate 121 of the second substrate 120.

The first spacer layer 11 may include a porous material having hydrophilicity and elasticity. The first spacer layer 11 may include, for example, a polymer material or a resin. The second spacer layer 12 may include a solid organic material.

The first spacer layer 11 and the second spacer layer 12 may have an opposite arrangement from that of FIG. 4. In other words, as shown in FIG. 5, the column spacer CS may include the second spacer layer 12 disposed on the common electrode 122 and the first spacer layer 11 disposed on the second spacer layer 12.

Since the first spacer layer 11 has the hydrophilicity and includes a plurality of holes H, the second fluid 132 may move between adjacent pixels PX through the holes H in the first spacer layer 11. That is, the second fluid 132 moves between the adjacent pixels PX through the channels CH and the holes H in the first spacer layer 11.

In addition, the first spacer layer 11 may substantially absorb an external impact since the first spacer layer 11 has the elasticity. Accordingly, the electrowetting display device 100 may effectively prevent damage due to the external impact thereto.

Referring to FIG. 6, the column spacer CS includes a porous material having the hydrophilicity and the elasticity. That is, in an exemplary embodiment, the column spacer CS includes only the porous material without including the solid organic material.

Therefore, the second fluid 132 moves between adjacent pixels PX through the channels CH and the holes H in the column spacer CS. In addition, the column spacer CS may substantially absorb the external impact since the column spacer CS has the elasticity. Accordingly, the electrowetting display device 100 may effectively prevent damage due to the external impact thereto.

Figure 7:
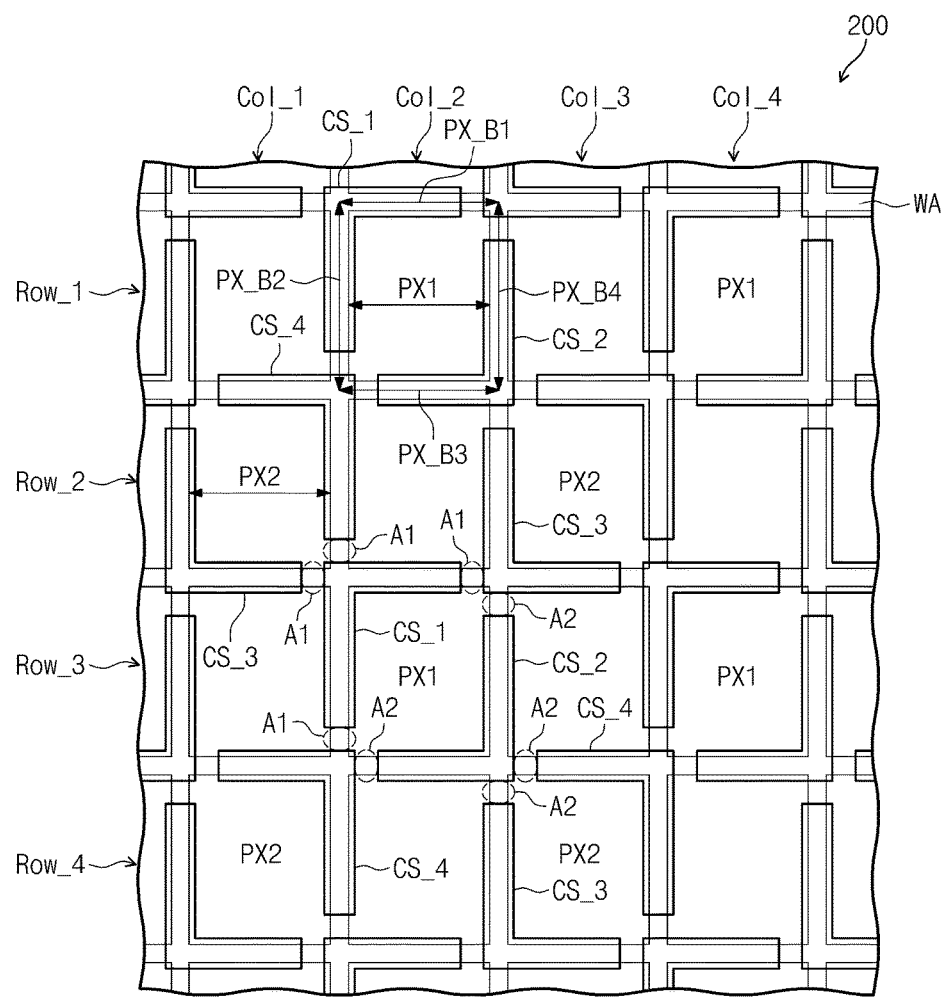
FIG. 7 is a plan view showing another exemplary embodiment of a configuration of a pixel, a partition wall, a column spacer, and a channel according to the invention.

FIG. 7 is a plan view showing another exemplary embodiment of a configuration of a pixel, a partition wall, a column spacer, and a channel according to the invention.

An electrowetting display device 200 shown in FIG. 7 has substantially the same configuration as the electrowetting display device 100 shown in FIG. 1 except for the configuration of the column spacer. Accordingly, a perspective view of another exemplary embodiment of the electrowetting display device 200 is omitted and only a plan configuration of the column spacers and the partition wall is shown in FIG. 7. In addition, for the convenience of explanation, the column spacers are shown in a bold line compared with the partition wall.

For the convenience of explanation, FIG. 7 shows pixels arranged in four rows Row_1 to Row_4 and four columns Col_1 to Col_4, however, it should be noted that the other pixels may have the same configuration.

Referring to FIG. 7, the pixels are arranged in rows and columns crossing the rows and have substantially a rectangular shape. A boundary area between the pixels is overlapped with an area including the partition wall WA.

The channels include a plurality of first channels A1 and a plurality of second channels A2. The column spacers include first, second, third, and fourth column spacers CS_1, CS_2, CS_3, and CS_4. The first to fourth column spacers CS_1 to CS_4 are disposed in the boundary area between the pixels except for the boundary area including the first channels A1 and the second channels A2, and the first to fourth column spacers CS_1 to CS_4 make contact with the partition wall WA.

Each pixel has substantially the rectangular shape, and the boundary area includes first to fourth boundary areas PX_B1 to PX_B4, respectively, corresponding to first to fourth sides of the pixel.

The first column spacer CS_1 is in the first and second boundary areas PX_B1 and PX_B2, which correspond to the first and second sides of pixels PX1 (hereinafter, refer to as "first pixels"), arranged in odd-numbered rows Row_1 and Row_3 and even-numbered columns Col_2 and Col_4. The first column spacer CS_1 is bent at substantially a right angle to form an "L" shape.

The second column spacer CS_2 is in the third and fourth boundary areas PX_B3 and PX_B4, which correspond to the third and fourth sides of the first pixels PX1, arranged in the odd-numbered rows Row_1 and Row_3 and the even-numbered columns Col_2 and Col_4. The second column spacer CS_2 is bent at substantially the right angle to form the "L" shape.

The third column spacer CS_3 is in the second and third boundary areas PX_B2 and PX_B3, which correspond to the second and third sides of pixels PX2 (hereinafter, refer to as "second pixels"), arranged in even-numbered rows Row_2 and Row_4 and odd-numbered columns Col_1 and Col_3. The third column spacer CS_3 is bent at substantially the right angle to form the "L" shape.

The fourth column spacer CS_4 is in the first and fourth boundary areas PX_B1 and PX_B4, which correspond to the first and fourth sides of the second pixels PX2, arranged in the even-numbered rows Row_2 and Row_4 and the odd-numbered columns Col_1 and Col_3. The fourth column spacer CS_4 is bent at substantially the right angle to form the "L" shape.

The first channels A1 are disposed between the first column spacer CS_1 and the third column spacer CS_3, which are adjacent to each other, and between the first column spacer CS_1 and the fourth column spacer CS_4, which are adjacent to each other.

The second channels A2 are disposed between the second column spacer CS_2 and the third column spacer CS_3, which are adjacent to each other, and between the second column spacer CS_2 and the fourth column spacer CS_4, which are adjacent to each other.

Each of the first and second channels A1 and A2 may have a width smaller than a distance between a surface (e.g., edge) of the first column spacer CS_1 and a surface (e.g., edge) of the second column spacer CS_2 adjacent to the first column spacer CS_1, the surface of the first column spacer CS1 and the surface of the second column spacer CS_2 facing each other. In addition, each of the first and second channels A1 and A2 may have a width smaller than a distance between a surface of the third column spacer CS_3 and a surface of the fourth column spacer CS_4 adjacent to the third column spacer CS_3, the surface of the third column spacer CS_3 and the surface of the fourth column spacer CS_4 facing each other. The width of the first channels A1 may be substantially the same as the width of the second channels A2.

The first to fourth column spacers CS_1 to CS_4 may have substantially the same cross-sectional configuration as that of the column spacer CS shown in FIGS. 4 to 6.

The movement of the second fluid and the operation of the pixel in the electrowetting display device 200 according to an exemplary embodiment shown in FIG. 7 are substantially same as those of the electrowetting display device 100 according to an exemplary embodiment shown in FIG. 1, and thus details thereof will be omitted.

Consequently, the electrowetting display device 200 maintains the cell gap thereof by using the first to fourth column spacers CS_1 to CS_4 and provides the flow path of the second fluid 132 using the first and second channels A1 and A2. In addition, the electrowetting display device 200 may effectively prevent damage due to the external impact thereto.

Figure 8:
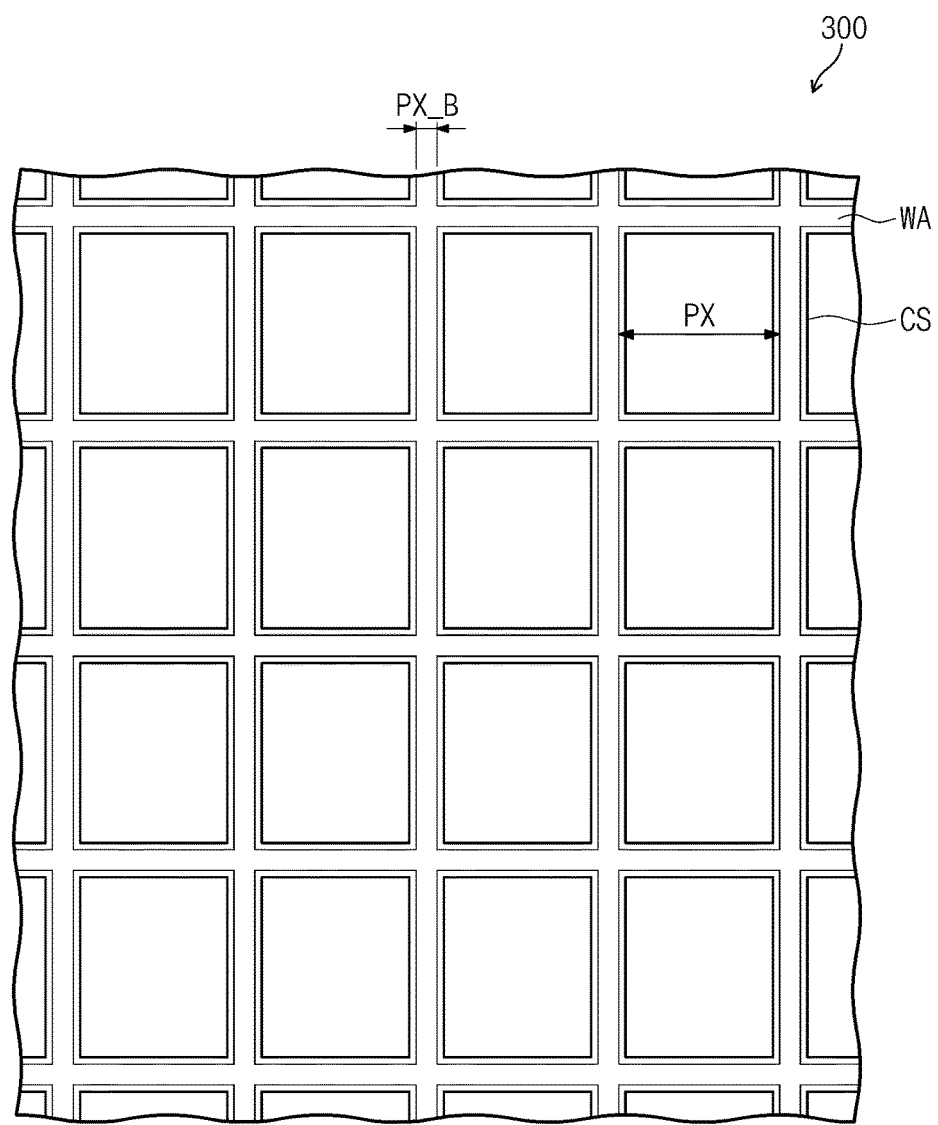
FIG. 8 is a plan view showing an exemplary embodiment of a configuration of a pixel, a partition wall, and a column spacer according to the invention.

FIG. 8 is a plan view showing an exemplary embodiment of a configuration of a pixel, a partition wall, and a column spacer according to the invention.

An electrowetting display device 300 shown in FIG. 8 has substantially the same configuration as the electrowetting display device 100 shown in FIG. 1 except that the electrowetting display device 300 does not include the channels and has a different configuration of the column spacer. Accordingly, a perspective view of the electrowetting display device 300 according to an exemplary embodiment is omitted and only a plan configuration of the column spacers and the partition wall is shown in FIG. 8. In addition, for the convenience of explanation, the column spacers CS are shown in a bold line compared with the partition wall WA.

For the convenience of explanation, FIG. 8 shows pixels arranged in four rows by four columns, however, it should be noted that the other pixels may have the same configuration.

Referring to FIG. 8, the pixels PX are arranged in rows and columns which cross each other. A boundary area PX_B between the pixels PX is overlapped with an area including the partition wall WA.

The column spacer CS overlaps with the boundary area PX_B and makes contact with the partition wall WA. That is, the column spacer CS is overlapped with and makes contact with the partition wall WA.

As shown in FIG. 8, the electrowetting display device 300 does not include channels and the column spacer CS includes the porous material having hydrophilicity and the elasticity, similar to the exemplary embodiment shown in FIG. 6.

Accordingly, when the pixels PX are driven, the second fluid of the electrowetting layer may move between adjacent pixels through a plurality of holes in the column spacer CS. In addition, the column spacer CS may substantially absorb the external impact since the column spacer CS has the elasticity. As a result, the electrowetting display device 300 may effectively prevent damage due to the external impact thereto.

The other configurations and the operation of the pixels in the electrowetting display device 300 shown in FIG. 8 are substantially the same as those of the electrowetting display device 100 shown in FIG. 1, and thus details thereof are omitted.

Figure 9:
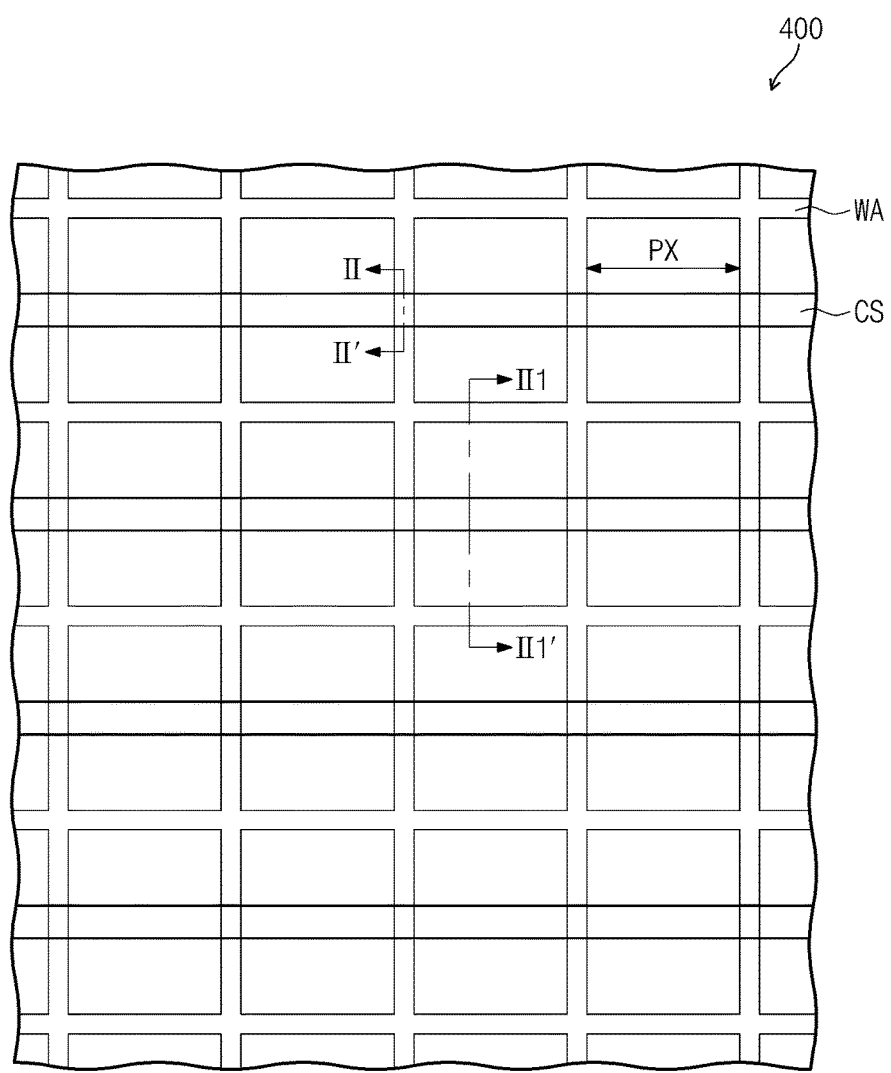
FIG. 9 is a plan view showing another exemplary embodiment of a configuration of a pixel, a partition wall, and a column spacer according to the invention.
Figure 10:
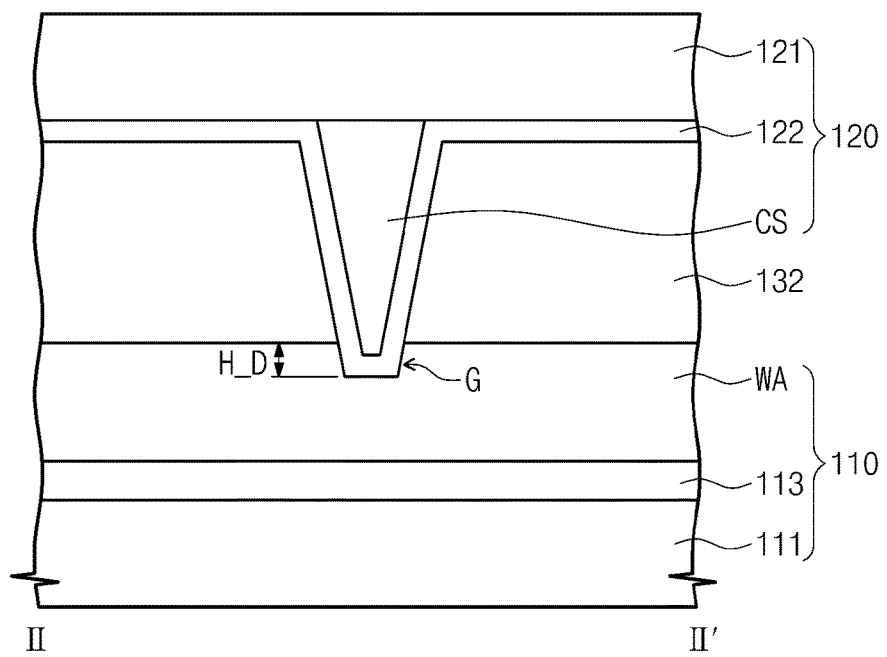
FIG. 10 is a cross-sectional view taken along line II-II' of FIG. 9.

FIG. 9 is a plan view showing another exemplary embodiment of a configuration of a pixel, a partition wall, and a column spacer according to the invention and FIG. 10 is a cross-sectional view taken along line II-II' of FIG. 9.

An electrowetting display device 400 shown in FIG. 9 has substantially the same configuration as the electrowetting display device 100 shown in FIG. 1 except that the electrowetting display device 400 does not include the channels and has a different configuration of the column spacer. Accordingly, a perspective view of the electrowetting display device 400 according to another exemplary embodiment is omitted and only a plan configuration of the column spacers and the partition wall is shown in FIG. 9. In addition, for the convenience of explanation, the column spacers are shown in a bold line compared with the partition wall.

For the convenience of explanation, FIG. 9 shows pixels arranged in four rows and four columns, however, it should be noted that the other pixels may have the same configuration. Also, in FIG. 10, the pixel electrode 112 arranged on the first base substrate 111 is not shown for purpose of clarity.

Referring to FIGS. 9 and 10, the column spacers CS extend in the row direction and each of the column spacers CS is disposed at a center portion of a corresponding pixel of the pixels PX, but the invention is not limited thereto or thereby. The column spacers CS are disposed on the second base substrate 121 and the common electrode 122 is disposed on the second base substrate 121 and the column spacers CS to cover the column spacers CS.

The partition wall WA disposed above the first base substrate 111 includes a groove G corresponding to the column spacers CS. A step difference H_D exists between the upper surface of the partition wall WA and a bottom surface of the groove G. The common electrode 122 makes contact with the partition wall WA in an area corresponding to the groove G.

The groove G is formed when the first substrate 110 is coupled to the second substrate 120. In detail, the common electrode 122 and the column spacer CS may include a more rigid material than that of the partition wall WA. Thus, the common electrode 122 and the column spacer CS are pressed against the partition wall WA by a pressure generated when the first substrate 110 is coupled to the second substrate 120, and thus the groove G is at an upper portion of the partition wall WA. That is, the common electrode 122 and the column spacer CS are entered into the partition wall WA to form the step difference H_D so that the common electrode 122 makes contact with the partition wall WA.

Figure 11A:
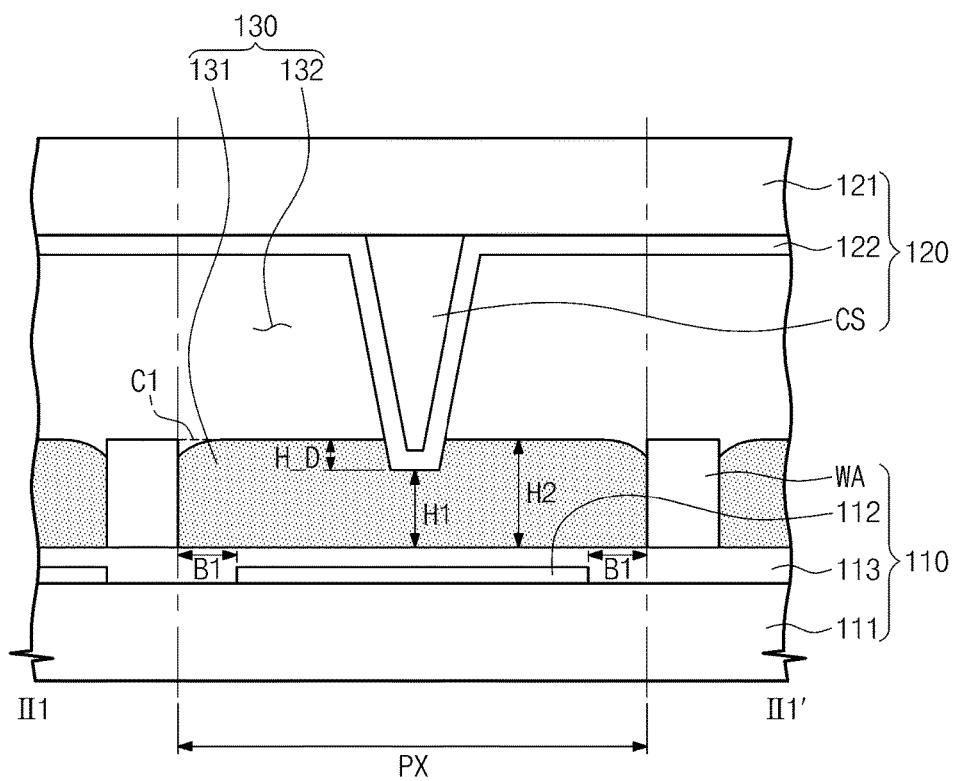
FIGS. 11A and 11B are cross-sectional views taken along line III-III' of FIG. 9.
Figure 11B:
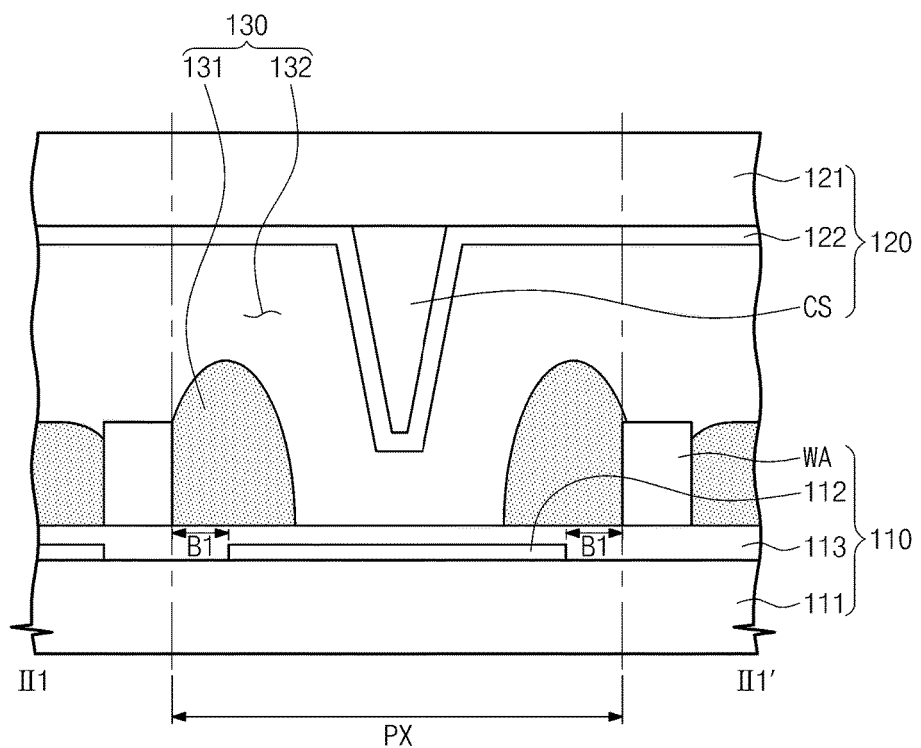

FIGS. 11A and 11B are cross-sectional views taken along line III-III' of FIG. 9. FIG. 11A shows the electrowetting layer when the gray scale voltage is not applied to the pixel and FIG. 11B shows the electrowetting layer when the gray scale voltage is applied to the pixel.

Referring to FIG. 11A, the electrowetting display device 400 includes the first substrate 110, the second substrate 120 facing the first substrate 110, the electrowetting layer 130 disposed between the first and second substrates 110 and 120. Since the electrowetting layer 130 has substantially the same configuration as described in FIG. 3A, details of the electrowetting layer 130 is omitted.

The first substrate 110 includes the first base substrate 111, the pixel electrodes 112 arranged on the first base substrate 111, the insulating layer 113 disposed on the first base substrate 111 and the pixel electrode 112 to cover the pixel electrode 112, and the partition wall WA disposed on the insulating layer 113.

The pixel PX includes first areas B1 corresponding to a gap between the partition wall WA and the pixel electrode 112.

The second substrate 120 includes the second base substrate 121, the column spacer CS disposed on the second base substrate 121 and positioned corresponding to a center portion of the pixel PX, and the common electrode 122 disposed on the second base substrate 121 and the column spacer CS to cover the column spacer CS.

The first fluid 131 of the electrowetting layer 130 is accommodated between the partition walls WA to have a first boundary surface C1 corresponding to a height of the upper surface of the partition wall WA. A thickness of the first fluid 131 in the pixel PX may be equal to or less than a height of the upper surface of the partition wall WA. The common electrode 122 makes contact with the partition wall WA in the groove G (see FIG. 10) on the partition wall WA, as described above with reference to FIG. 10. That is, the common electrode 122 and the column spacer CS are inserted into the partition wall WA by the step difference H_D in an area where the column spacer CS crosses the partition wall WA, as shown in FIG. 10, and thus the common electrode 122 makes contact with the partition wall WA. Therefore, the common electrode 122 and the column spacer CS, in an area where the column spacer CS crosses the center portion of the pixel PX, are dipped or protruded into the first fluid 131 by the step difference H_D.

Accordingly, the first fluid 131 has a first height H1 corresponding to a bottom surface of the common electrode 122 from the insulating layer 113 and a second height H2 corresponding to the first boundary surface C1 from the insulating layer 113, the second height H2 being higher than the first height H1.

When the gray scale voltage is not applied to the pixel electrode 112, as shown in FIG. 11A, the pixel PX displays the black gray scale since the first fluid 131 covers the insulating layer 113 in an area of the pixel PX.

Referring to FIG. 11B, when the pixel electrode 112 is applied with the gray scale voltage and the common electrode 122 is applied with the common voltage, the second fluid 132 becomes polarized. Thus, the second fluid 132 pushes out the first fluid 131 to both side portions of the pixel PX and makes contact with the insulating layer 113.

In more detail, the second fluid 132 pushes out the first fluid 131 in an area in which the height of the first fluid 131 is relatively small. As described above, the first fluid 131 has the first height H1 and the second height H2. Since the first height H1 is smaller than the second height H2, the second fluid 132 first makes contact with the insulating layer 113 in an area corresponding to the bottom surface of the common electrode 122 which forms the first height H1 from the insulating layer 113 at the center portion of the pixel PX.

A distance between the common electrode 122 on a lower surface of the column spacer CS and the pixel electrode 112 is shorter than a distance between the common electrode 122 on the second base substrate 121 and the pixel electrode 112. Thus, an electric field generated between the common electrode 122 on the lower surface of the column spacer CS and the pixel electrode 112 has an intensity stronger than an intensity of an electric field generated between the common electrode 122 on the second base substrate 121 and the pixel electrode 112.

As a result, the second fluid 132 first pushes out the first fluid 131 in an area in which the first fluid 131 has a relatively small height, e.g., H1, and first makes contact with the insulating layer 113 corresponding to the lower surface of the column spacer CS due to the electric field generated between the common electrode 122 on the lower surface of the column spacer CS and the pixel electrode 112.

An area in which the first fluid 131 is separated by the second fluid 132 to allow the second fluid 132 to contact with the insulating layer 113 may be defined as a break point of a stream of the first fluid 131. That is, the break point of the stream of the first fluid 131 may be set to an area at the center portion of the pixel PX corresponding to the lower surface of the column spacer CS.

As a distance by which the first fluid 131 is pushed out increases, a travel time of the first fluid 131 becomes longer. Accordingly, when the first fluid 131 moves to the both side portions of the pixel PX from the area at the center portion of the pixel PX, the travel time of the first fluid 131 is reduced. In other words, in order to effectively reduce the travel time of the first fluid 131, the column spacer CS may be at the center portion of the pixel PX such that the break point of the stream of the first fluid 131 is located at the center portion of the pixel PX.

The first fluid 131 includes the organic solvent which tends to gather together. Accordingly, the first fluid 131 is pushed out to the both side portions of the pixel PX by the second fluid 132 and stably gathered in the both side portions of the pixel PX.

In an exemplary embodiment, since the pixel electrode PX is not in the first areas B1 of the pixel PX shown in FIG. 11B, an electric field is not generated in the first areas B1. As a result, the first fluid 131 may be gathered in the both side portions of the pixel PX, which include the first areas B1. In this case, the light transmits through the second fluid 132, so that the pixel PX displays a predetermined image.

As described above, the electrowetting display device 400 according to another exemplary embodiment may control the break point of the stream of the first fluid 131.

Figure 12:
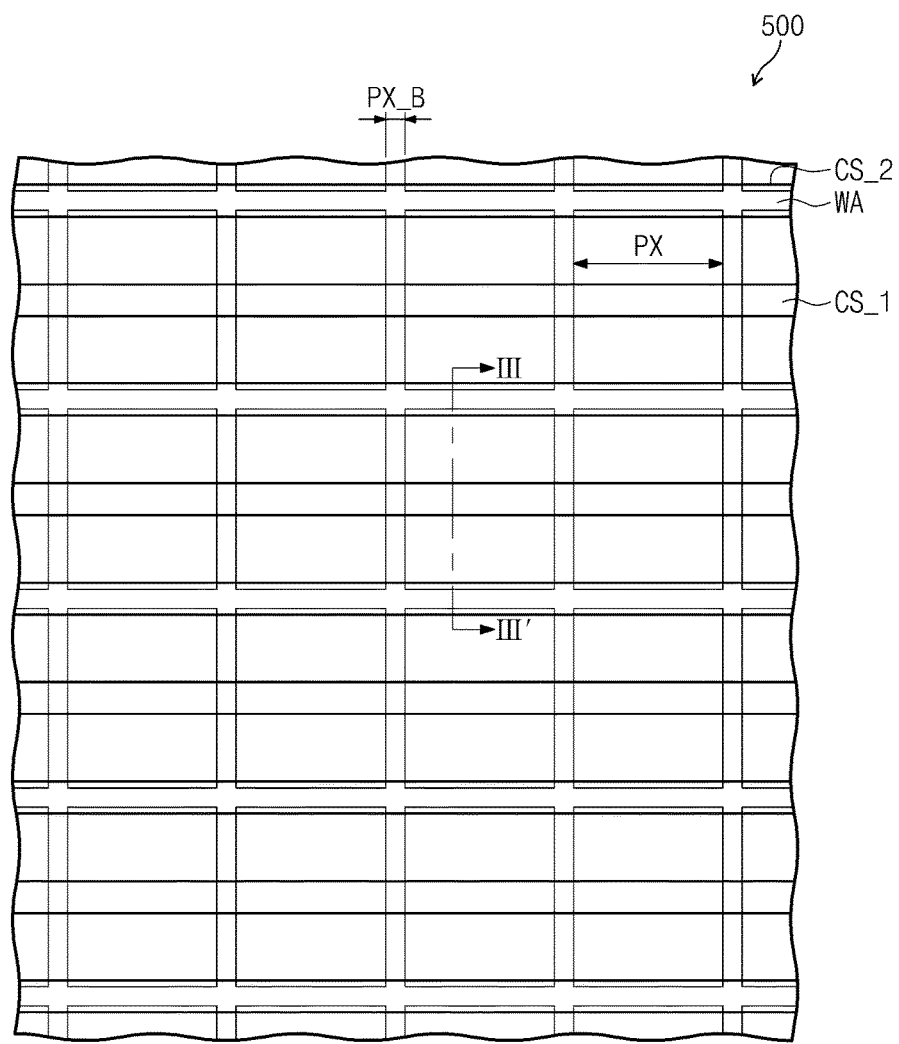
FIG. 12 is a plan view showing still another exemplary embodiment of a configuration of a pixel, a partition wall, and a column spacer according to the invention.
Figure 13:
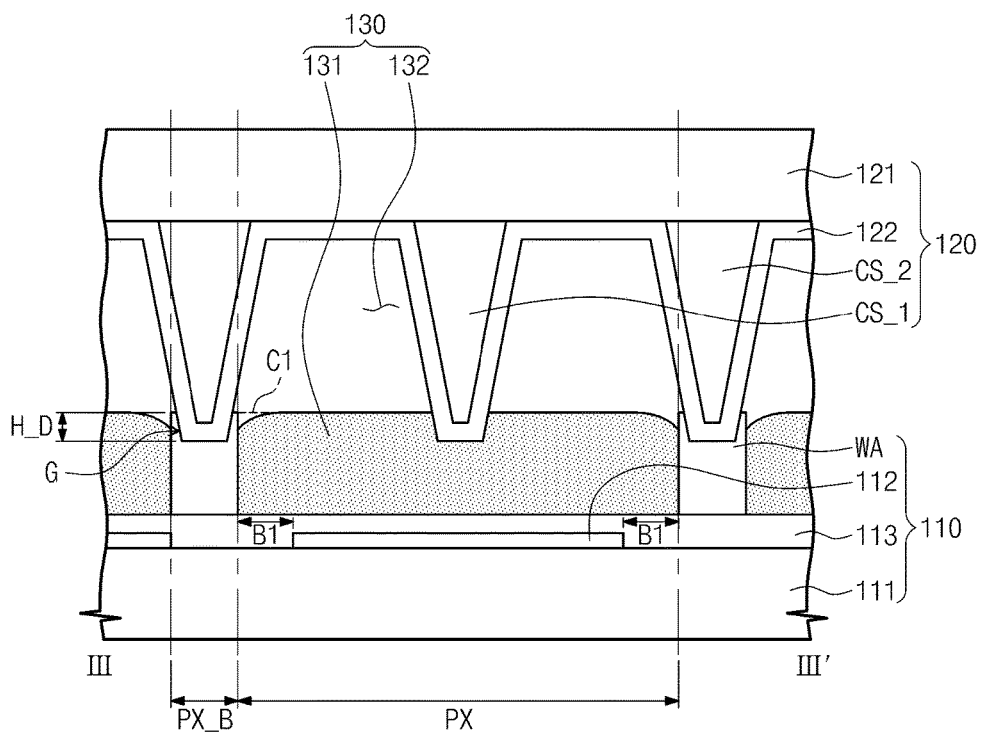
FIG. 13 is a cross-sectional view taken along line III-III' of FIG. 12.

FIG. 12 is a plan view showing still another exemplary embodiment of a configuration of a pixel, a partition wall, and a column spacer according to the invention and FIG. 13 is a cross-sectional view taken along line III-III' of FIG. 12.

An electrowetting display device 500 shown in FIG. 12 has substantially the same configuration as the electrowetting display device 400 shown in FIG. 9 except for the configuration of the column spacer. Accordingly, only a difference from the electrowetting display device 400 will be mainly described. For the convenience of explanation, FIG. 12 shows only a plan configuration of the pixels arranged in four rows and four columns, the column spacers, and the partition walls, and the column spacers are shown in a bold line compared with the partition wall.

Referring to FIGS. 12 and 13, a plurality of first column spacers CS_1 extending in a row direction and a plurality of second column spacers CS_2 extending in the row direction are disposed on the second base substrate 121. The common electrode 122 is disposed on the second base substrate 121 and the first and second column spacers CS_1 and CS_2 to cover the first and second column spacers CS_1 and CS_2.

The first column spacers CS_1 and the second column spacers CS_2 may have substantially the same size. The first column spacers CS_1 are located at a center portion of the pixels PX arranged in a unit of row. The second column spacers CS_2 are located at the boundary areas PX_B of the pixels PX and extend in the row direction.

The partition wall WA includes a groove G in an area in which the second column spacer CS_2 crosses the partition wall. A step difference H_D exists between the upper surface of the partition wall WA and a bottom surface of the groove G.

Although not shown in FIGS. 12 and 13, the common electrode 122 covering the first column spacers CS_1 makes contact with the partition wall WA in the groove G in substantially the same manner as described in FIG. 10. The common electrode 122 on a lower surface of the second column spacers CS_2 makes contact with the partition wall WA in the groove G.

A groove of the partition wall WA that makes contact with the common electrode 122 on the lower surface of the first column spacers CS_1 may be referred to as a first groove (not shown), and a groove of the partition wall WA that makes contact with the common electrode 122 on the lower surface of the second column spacers CS_2 may be referred to as a second groove, i.e., the groove G in FIG. 13.

The groove G is formed when the first substrate 110 is coupled to the second substrate 120. In detail, the common electrode 122 and the first and second column spacers CS_1 and CS_2 may include a more rigid material than that of the partition wall WA. Thus, the common electrode 122 and the first and second column spacers CS_1 and CS_2 are pressed against the partition wall WA by a pressure generated when the first substrate 110 is coupled to the second substrate 120, and thus the groove G, including the first groove, is at the upper portion of the partition wall WA. That is, the common electrode 122 and the first and second column spacers CS_1 and CS_2 are pressed against the partition wall WA to form the step difference H_D so that the common electrode 122 makes contact with the partition wall WA. Therefore, the common electrode 122 and the first column spacers CS_1, which are disposed on the center portion of the pixel PX, are dipped or protruded into the first fluid 131 by the step difference H_D.

A method of controlling the break point of the stream the first fluid 131 and the operation of the pixels PX are substantially the same as described with reference to FIGS. 11A and 11B.

Consequently, the electrowetting display device 500 may stably maintain the cell gap using the second column spacers CS_2 and control the break point of the stream of the first fluid 131 by using the first column spacers CS_1, at least for a part of the electrowetting display device 500 shown in FIG. 13.

Figure 14:
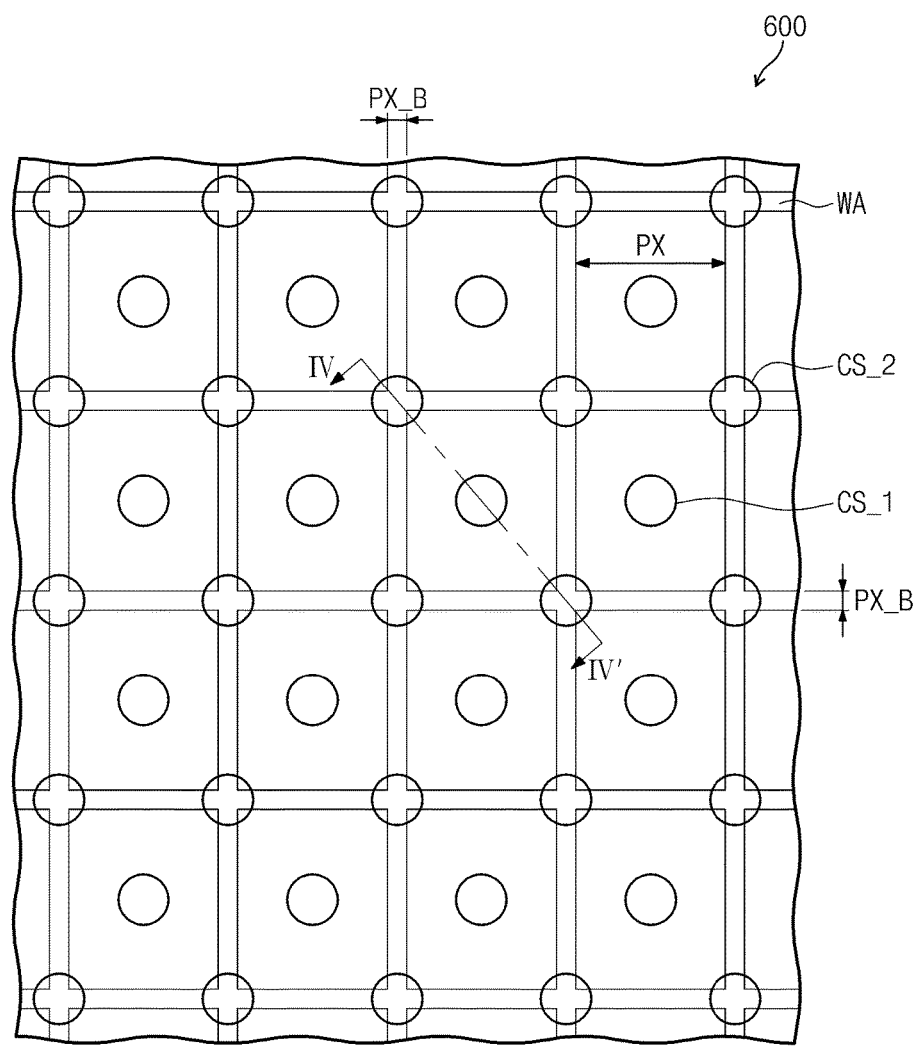
FIG. 14 is a plan view showing still another exemplary embodiment of a configuration of a pixel, a partition wall, and a column spacer according to the invention.
Figure 15:
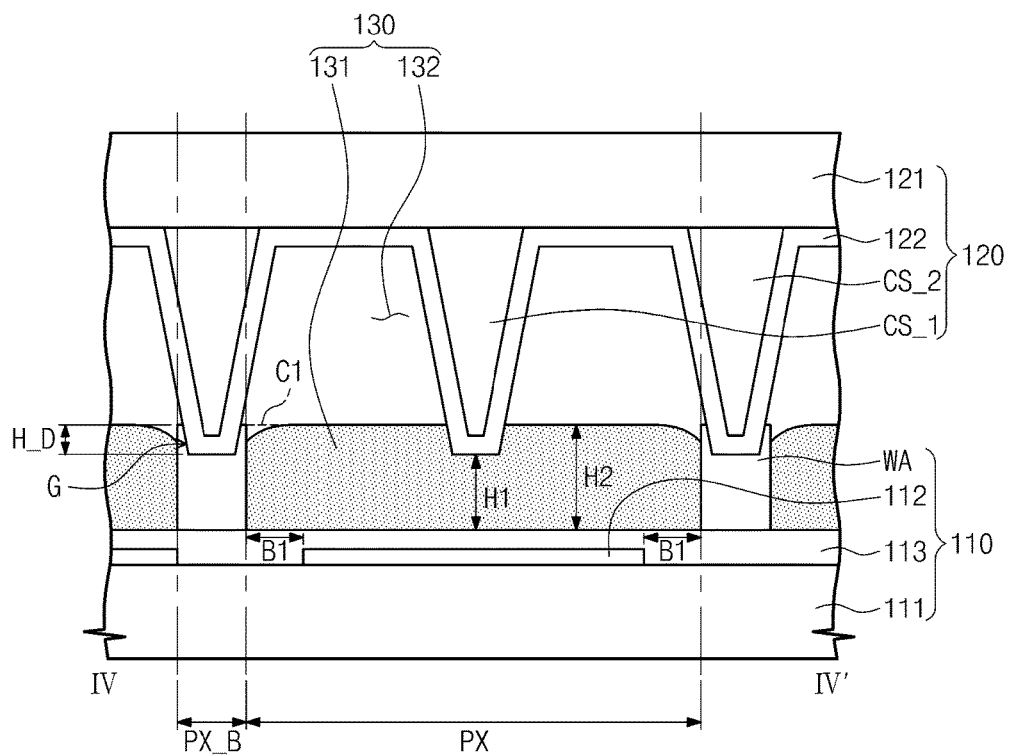
FIG. 15 is a cross-sectional view taken along line IV-IV' of FIG. 14.

FIG. 14 is a plan view showing still another exemplary embodiment of a configuration of a pixel, a partition wall, and a column spacer according to the invention and FIG. 15 is a cross-sectional view taken along line IV-IV' of FIG. 14.

An electrowetting display device 600 shown in FIG. 14 has substantially the same configuration as the electrowetting display device 500 shown in FIG. 12 except for the configuration of the column spacer. Accordingly, a difference from the electrowetting display device 500 will be mainly described. For the convenience of explanation, FIG. 14 shows only a plan configuration of the pixels arranged in four rows and four columns, the column spacers, and the partition walls, and the column spacers are shown in a bold line compared with the partition wall.

Referring to FIGS. 14 and 15, a plurality of first column spacers CS_1 and a plurality of second column spacers CS_2 are disposed on the second base substrate 121. The common electrode 122 is disposed on the second base substrate 121 and the first and second column spacers CS_1 and CS_2 to cover the first and second column spacers CS_1 and CS_2. The first and second column spacers CS_1 and CS_2 may have substantially a cylindrical shape.

The first column spacers CS_1 are located at a center portion of the pixels PX. The second column spacers CS_2 are located at an intersection area of the boundary areas PX_B between the pixels PX. In detail, the partition wall WA has a lattice shape to partition the pixels PX. Accordingly, the boundary areas PX_B overlapped with the partition wall WA may have the lattice shape, and intersection areas of the boundary areas PX_B having the lattice shape correspond to intersection areas defined by rows and columns of the partition walls WA. The second column spacers CS_2 are respectively located at the intersection areas of the boundary areas PX_B, and the common electrode 122 on the lower surface of the second column spacers CS_2 makes contact with the partition wall WA.

The partition walls WA include grooves G in areas contacted by the second column spacers CS_2. A step difference H_D exists between the upper surface of the partition wall WA and a bottom surface of the groove G.

The common electrode 122 on the lower surface of the second column spacers CS_2 makes contact with the partition wall WA in the grooves G.

The common electrode 122 and the first and second column spacers CS_1 and CS_2 may include a more rigid material than that of the partition wall WA.

The grooves G are formed when the first substrate 110 is coupled to the second substrate 120. In detail, the common electrode 122 and the second column spacers CS_2 are pressed against the partition wall WA by a pressure generated when the first substrate 110 is coupled to the second substrate 120, and thus the grooves G are at the upper portion of the partition wall WA. That is, the common electrode 122 and the second column spacers CS_2 are pressed against the partition wall WA to form the step difference H_D so that the common electrode 122 makes contact with the partition wall WA.

The first and second column spacers CS_1 and CS_2 may have the same size. The first fluid 131 of the electrowetting layer 130 is accommodated in the pixel PX to fill the area of the pixel PX to reach the height of the first boundary surface C1 corresponding to the upper surface of the partition wall WA. The common electrode 122 on the lower surface of the second column spacers CS_2 makes contact with the partition wall WA in the grooves G. That is, the common electrode 122 and the second column spacers CS_2 are inserted into the partition wall WA by the step difference H_D, and thus the common electrode 122 makes contact with the partition wall WA. Therefore, the common electrode 122 and the first column spacers CS_1, which are disposed on the center portion of the pixel PX, are dipped or protruded into the first fluid 131 by the step difference H_D.

The break point of the stream of the first fluid 131 may be set to a center plane area of the pixel PX by the first column spacers CS_1 at the center portion of the pixel PX. In detail, when the first column spacers CS_1 have substantially the cylindrical shape, the break point of the stream of the first fluid 131 may be set to a circular area of the center portion of the pixel overlapped with the first column spacer CS_1. That is, the second fluid 132 first makes contact with the insulating layer 113 in the circular area overlapped with the first column spacer CS_1 and the first fluid 131 is gathered to both side portions of the pixel PX. Thus, the electrowetting display device 600 may control the break point of the stream of the first fluid 131.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. An electrowetting display device comprising:
   a first base substrate;
   a partition wall on the first base substrate and partitioning a plurality of pixels;
   a second base substrate facing the first base substrate;
   a first fluid and a second fluid immiscible with each other, the first fluid electrically non-conductive, and the second fluid at least one of polar or electrically conductive;
   a plurality of channels between the partition wall and the second base substrate and between adjacent pairs of pixels of the plurality of pixels; and
   column spacers on the second base substrate and contacting the partition wall, the column spacers between the second base substrate and the partition wall, wherein each of the column spacers is made entirely of a hydrophilic porous material, wherein bottoms of the plurality of channels are at a height above the first base substrate so as to (i) allow the second fluid to flow among more than two of the plurality of pixels through the plurality of channels and to (ii) substantially prevent the first fluid from flowing through the plurality of channels.

2. The electrowetting display device of claim 1, wherein each of the column spacers comprises a first branch portion which extends in a first direction, and a second branch portion and a third branch portion which alternately extend from the first branch portion in directions substantially crossing the first direction,
   the second branch portion extends in a right direction from the first branch portion, and
   the third branch portion extends in a left direction from the first branch portion.

3. The electrowetting display device of claim 2, wherein the plurality of channels comprises a plurality of first channels and a plurality of second channels,
   at least one of the first channels is between the second branch portion, and the first branch portion adjacent to the second branch portion, and wherein
   at least one of the second channels is between the third branch portion, and the first branch portion adjacent to the third branch portion.

4. The electrowetting display device of claim 3, wherein:
   at least one of the first channels has a width smaller than a distance between two first branch portions adjacent to each other,
   at least one of the second channels has a width smaller than the distance between two first branch portions adjacent to each other, and
   the width of at least one of the first channels is substantially equal to the width of at least one of the second channels.

5. The electrowetting display device of claim 1, wherein the porous material is elastic.

6. The electrowetting display device of claim 1, wherein each of the column spacers comprises:
a first spacer layer which comprises the porous material having elasticity; and
a second spacer layer which comprises a solid organic material.

7. The electrowetting display device of claim 6, wherein the first spacer layer is in contact with the second base substrate and the second spacer layer is in contact with the partition wall.

8. The electrowetting display device of claim 6, wherein the second spacer layer is in contact with the second base substrate and the first spacer layer is in contact with the partition wall.

9. The electrowetting display device of claim 1, further comprising a common electrode which is on the second base substrate, wherein the column spacers are on the common electrode.

10. The electrowetting display device of claim 9, further comprising:
a plurality of pixel electrodes which is on the first base substrate and respectively correspond to the plurality of pixels; and
an insulating layer which is on the first base substrate, wherein
the insulating layer covers the plurality of pixel electrodes,
the partition wall is on the insulating layer, and
the first fluid is on the insulating layer.

11. The electrowetting display device of claim 1, wherein
the plurality of channels are in a boundary area between the pixels,
the boundary area overlaps with the partition wall,
the plurality of pixels are arranged in rows and columns,
each of the plurality of pixels has substantially a rectangular shape, and
the boundary area comprises first, second, third and fourth boundary areas respectively corresponding to first, second, third and fourth sides of each of the plurality of pixels.

12. The electrowetting display device of claim 11, wherein the column spacers comprise:
a first column spacer in the first and second boundary areas corresponding to first pixels arranged in odd-numbered rows and even-numbered columns, and having a right angle bent shape;
a second column spacer in the third and fourth boundary areas corresponding to the first pixels, and having a right angle bent shape;
a third column spacer in the second and third boundary areas corresponding to second pixels arranged in even-numbered rows and odd-numbered columns, and having a right angle bent shape; and
a fourth column spacer in the first and fourth boundary areas corresponding to the second pixels, and having a right angle bent shape.

13. The electrowetting display device of claim 12, wherein:
the plurality of channels comprises:
a plurality of first channels which are between the first column spacer and the third column spacer which are adjacent to each other, and between the first column spacer and the fourth column spacer which are adjacent to each other, respectively; and
a plurality of second channels which are between the second column spacer and the third column spacer which are adjacent to each other, and between the second column spacer and the fourth column spacer which are adjacent to each other, respectively,
at least one of the first and second channels has a width smaller than a distance between a surface of the first column spacer and a surface of the second column spacer adjacent to the first column spacer, the surface of the first column spacer and the surface of the second column spacer facing each other, and
the width of at least one of the first channels is substantially equal to the width of at least one of the second channels.

14. The electrowetting display device of claim 1, wherein each of the column spacers is tapered such that a first contact area of each of the column spacers is smaller than a second contact area of each of the column spacers, and wherein the first contact area is adjacent to the partition wall and the second contact area is adjacent to the second base substrate.

15. An electrowetting display device comprising:
a first base substrate;
a partition wall (i) on the first base substrate and (ii) partitioning a plurality of pixels;
a second base substrate facing the first base substrate;
a plurality of first column spacers (i) extending in a row direction on the second base substrate, crossing a center portion of a row of the plurality of pixels, wherein the first column spacers are made entirely of a hydrophilic porous material; and (iii) between the second base substrate and the partition wall;
a plurality of second column spacers extending in the row direction, wherein the second column spacers are made entirely of the hydrophilic porous material;
a first fluid and a second fluid between the first and second base substrates, wherein the first fluid and the second fluid are immiscible with each other, wherein the first fluid is electrically non-conductive, wherein the second fluid is at least one of polar or electrically conductive, and wherein the first and the second column spacers comprise a plurality of holes configured to allow the second fluid to move between adjacent pairs of the pixels; and
a common electrode (i) on the second base substrate and (ii) covering the first column spacers and the second column spacers, wherein
the partition wall comprises first grooves respectively located in regions where the first column spacers cross the partition wall,
bottoms of the first grooves are at a height above the first base substrate so as to (i) allow the second fluid to flow among more than two of the plurality of pixels through the first grooves and to (ii) substantially prevent the first fluid from flowing through the first grooves, and
the common electrode which is on a lower surface of each of the first column spacers contacts the partition wall in the first grooves, respectively.

16. The electrowetting display device of claim 15, wherein
the first fluid is in the plurality of pixels and comprises a first boundary surface corresponding to an upper surface of the partition wall, and
the plurality of first porous column spacers, and the common electrode which is on the lower surface of the plurality of first porous column spacers, protrude into the first fluid in a region corresponding to the center portion of the row of the plurality of pixels, by a step difference between the upper surface of the partition wall and a bottom surface of the first grooves.

17. The electrowetting display device of claim 16, wherein the plurality of second porous column spacers overlies boundary areas between the plurality of pixels, the boundary areas extending in a row direction.

18. The electrowetting display device of claim 17, wherein
the partition wall further comprises second grooves respectively located in regions where the second porous column spacers cross the partition wall, and
the common electrode which is on a lower surface of each of the second porous column spacers contacts the partition wall in the second grooves, respectively.

19. The electrowetting display device of claim 16, further comprising:
a plurality of pixel electrodes which is on the first base substrate and respectively corresponds to the plurality of pixels; and
an insulating layer which is on the first base substrate and covers the plurality of pixel electrodes, wherein
the partition wall is on the insulating layer, and
with a gray scale voltage applied respectively to the plurality of pixel electrodes and a common voltage applied to the common electrode:
the second fluid contacts the insulating layer in an area overlapped with the plurality of first porous column spacers, and
the second fluid in contact with the insulating layer pushes the first fluid to side portions of the plurality of pixels, respectively.

20. The electrowetting display device of claim 15, wherein the common electrode and the plurality of first porous column spacers comprise a more rigid material than that of the partition wall.

21. An electrowetting display device comprising:
a first base substrate;
a partition wall on the first base substrate and partitioning a plurality of pixels;
a second base substrate facing the first base substrate;
a column spacer on the second base substrate and overlapping the partition wall, the column spacer between the second base substrate and the partition wall, wherein the column spacer is made entirely of a porous material;
a common electrode on the second base substrate and covering the column spacer; and
an electrowetting layer between the first and second base substrates and comprising a first fluid and a second fluid that are immiscible with each other, the second fluid having at least one of electrical conductivity or electrical polarity, wherein
the porous column spacer comprises the porous material having hydrophilicity and elasticity,
the porous column spacer comprises a plurality of holes configured to allow the second fluid to move between adjacent pairs of the pixels, and
the common electrode which is on a lower surface of the porous column spacer contacts the partition wall.

22. An electrowetting display device comprising:
a first base substrate;
a partition wall on the first base substrate and partitioning a plurality of pixels;
a first boundary surface corresponding to an upper surface of the partition wall;
a second base substrate facing the first base substrate;
column spacers on the second base substrate and having a cylinder shape, wherein the column spacers are made entirely of a porous material;
a common electrode on the second base substrate and covering the column spacers; and
an electrowetting layer between the first and second base substrates and comprising a first fluid and a second fluid that are immiscible with each other, the first fluid having at least one of electrical non-conductivity or electrical non-polarity, and the second fluid having at least one of electrical conductivity or electrical polarity, and wherein
each of the column spacers comprises
a plurality of first column spacers located at a center portion of pixel rows, and
a plurality of second column spacers that (i) are in a boundary area between the plurality of pixels (ii) overlaps with the partition wall,
the partition wall comprising grooves; and (iii) are between the partition wall and the second base substrate,
the common electrode that is on a lower surface of the second column spacers is in contact with the partition wall in the plurality of grooves,
the grooves are configured to (i) allow the second fluid to flow among more than two of the plurality of pixels through the grooves and (ii) substantially prevent the first fluid from flowing through the grooves,
the column spacers comprise a plurality of holes configured to allow the second fluid to move between adjacent pairs of the pixels, and
the first column spacers, and the common electrode that is on a lower surface of the first column spacers, protrude into the first fluid by a step difference between the upper surface of the partition wall and a bottom surface of the grooves.

* * * * *